(12) United States Patent
Workman et al.

(10) Patent No.: US 10,551,161 B2
(45) Date of Patent: Feb. 4, 2020

(54) METHOD AND APPARATUS FOR VERIFYING PERPENDICULARITY OF CONCRETE TEST SPECIMEN

(71) Applicant: Deslauriers, Inc., LaGrange Park, IL (US)

(72) Inventors: Gary Workman, Las Vegas, NV (US); Thor Moody, Wesley Chapel, FL (US)

(73) Assignee: Deslauriers, Inc., LaGrange Park, IL (US)

( * ) Notice: Subject to any disclaimer, the term of this patent is extended or adjusted under 35 U.S.C. 154(b) by 215 days.

(21) Appl. No.: 15/481,024

(22) Filed: Apr. 6, 2017

(65) Prior Publication Data

US 2018/0292195 A1    Oct. 11, 2018

(51) Int. Cl.
*G01B 5/245* (2006.01)
*G01B 5/28* (2006.01)

(52) U.S. Cl.
CPC .............. *G01B 5/245* (2013.01); *G01B 5/285* (2013.01)

(58) Field of Classification Search
CPC ................................. G01B 5/285; G01B 5/245
USPC ............ 33/533, 474, 501.08, 501.09, 501.45
See application file for complete search history.

(56) References Cited

U.S. PATENT DOCUMENTS

| | | | | |
|---|---|---|---|---|
| 1,836,407 A * | 12/1931 | Stover | .................... | G01B 3/566 33/197 |
| 2,715,278 A * | 8/1955 | Harrison | ................ | G01B 3/566 33/429 |
| 3,273,252 A * | 9/1966 | Bunge | .................... | G01B 5/245 33/474 |
| 4,375,724 A * | 3/1983 | Brock | ...................... | G01B 5/24 33/529 |
| 4,805,315 A * | 2/1989 | Nesbitt | ................... | B25B 5/145 248/248 |
| 5,855,073 A * | 1/1999 | Boelling | .............. | A47B 96/061 248/235 |
| 6,279,241 B1 * | 8/2001 | Chen | ........................ | G01B 3/30 33/199 R |
| 6,442,856 B1 * | 9/2002 | Warner | .................... | B43L 7/10 33/429 |
| 7,546,687 B2 * | 6/2009 | Haala | ...................... | B43L 7/027 33/415 |
| 7,627,955 B1 * | 12/2009 | Perkey | ...................... | B43L 7/14 33/427 |
| 2007/0245581 A1 * | 10/2007 | Hios | ......................... | B43L 7/10 33/429 |
| 2007/0245582 A1 * | 10/2007 | Bittner | .................. | G01B 3/566 33/474 |
| 2008/0148587 A1 * | 6/2008 | Goodrich | .............. | B25H 7/005 33/529 |

* cited by examiner

*Primary Examiner* — Christopher W Fulton
(74) *Attorney, Agent, or Firm* — Wood, Phillips, Katz, Clark & Mortimer

(57) ABSTRACT

A perpendicularity verification device is provided for verifying perpendicularity of a concrete test specimen in a testing machine. The device comprises a unitary planar sheet. The sheet has an elongate vertical straight side edge and a horizontal straight bottom edge. The side and bottom edges are perpendicular to one another. A corner notch is provided between the side and bottom edges. In use, the bottom edge rests on a platen of the testing machine so that the notch circumvents a retaining cup of the testing machine and the vertical edge rests against the test specimen.

10 Claims, 3 Drawing Sheets

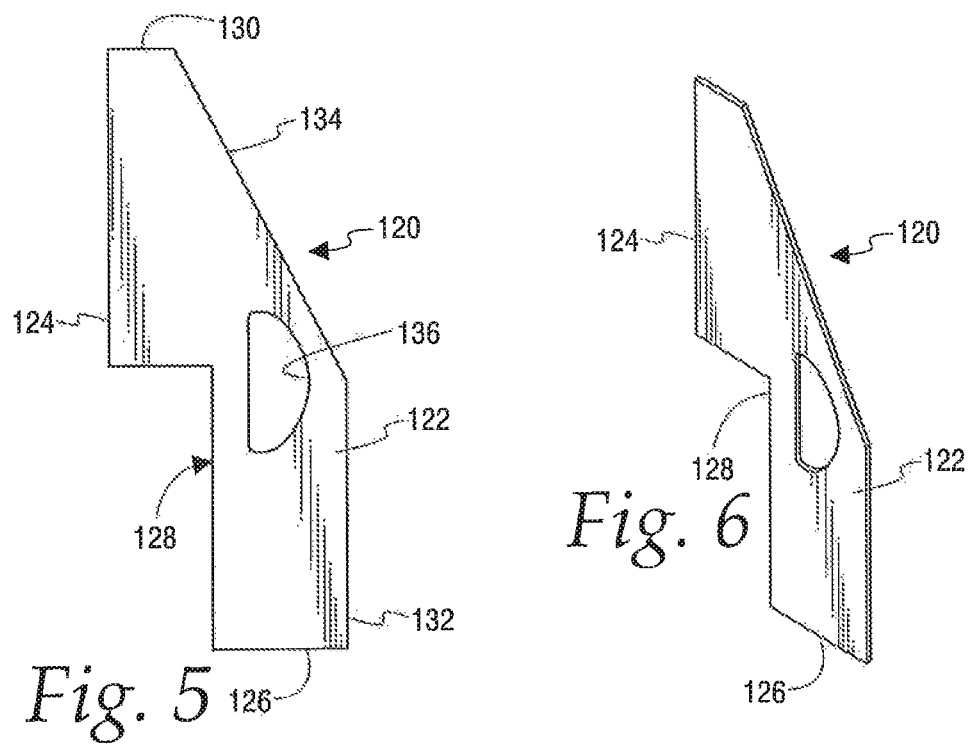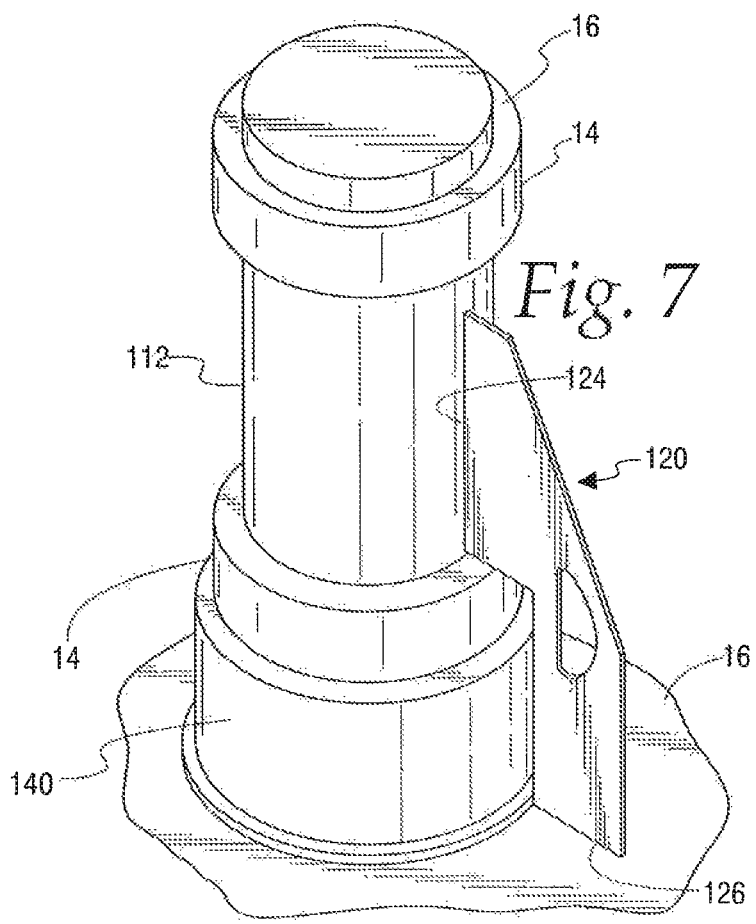

METHOD AND APPARATUS FOR VERIFYING PERPENDICULARITY OF CONCRETE TEST SPECIMEN

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This application relates to compression testing of concrete test specimens and, more particularly, to an apparatus and method for verifying perpendicularity of concrete test specimens.

BACKGROUND OF THE INVENTION

Various tests have been developed to ensure that concrete used in particular applications satisfies specifications. One of these is a compression test for testing cylindrical concrete test specimens. ASTM Standard C39 defines a test method for such tests.

The test method uses a testing machine that applies a comprehensive force to molded cylinders until failure occurs. The testing machine includes two steel bearing blocks with hardened faces. The bearing blocks must be of a larger size than the diameter of the specimen to be tested. As such, the bearing blocks extend beyond the periphery of the specimens. The standard also requires that the test specimen be substantially perpendicular to the axis before testing. Neither end of the specimen shall depart from perpendicularity by more than 0.5 degrees.

Presently, there is no known device specifically designed to aid in testing of perpendicularity. Lab technicians often use a combination of levels, straight edges and gauges to help determine perpendicularity. This can be time consuming and may provide inconsistent results.

The present invention is directed to further improvements in concrete cylinder compression testing.

SUMMARY OF THE INVENTION

As described herein, a method and apparatus are disclosed for verifying perpendicularity of a concrete test specimen.

In one aspect, a perpendicularity verification device is provided for verifying perpendicularity of a concrete test specimen in a testing machine. The device comprises a unitary planar sheet. The sheet has an elongate vertical straight side edge and a horizontal straight bottom edge. The side and bottom edges are perpendicular to one another. A corner notch is provided between the side and bottom edges. In use, the bottom edge rests on a platen of the testing machine so that the notch circumvents a retaining cup of the testing machine and the vertical edge rests against the test specimen.

It is a feature that the planar sheet may be made of metal, such as aluminum.

It is another feature that the sheet is about 11 to 12 inches long and the vertical edge is about 10 inches long. The sheet may be about 4 to 5 inches wide and the bottom edge about 2 to about 2.5 inches wide.

It is a further feature that the sheet has a diagonal edge opposite the corner notch.

It is yet another feature that the sheet includes a through opening to provide a handle.

It is a further feature that the notch is rectangular.

There is disclosed in accordance with another aspect, a method of verifying perpendicularity of a concrete test specimen in a testing machine, comprising: positioning a concrete specimen with retaining cups on a platen of a testing machine; positioning a perpendicularity verification device on the platen, the device comprising a unitary planar sheet, the sheet having an elongate vertical straight side edge, a horizontal straight bottom edge, the side and bottom edges being perpendicular to one another, and a corner notch between the side and bottom edges; with the bottom edge of the device resting on the platen with the notch circumventing the retaining cup positioning the vertical edge so that it rests against the test specimen; and verifying that any gaps between the vertical edge and the test specimen are less than a select amount to verify perpendicularity.

It is a feature that the gap verification step comprises using a tool have a select thickness. The select thickness corresponds to 0.5 degrees of slope along vertical length of the test specimen Further features and advantages will be readily apparent from the specification and from the drawings.

BRIEF DESCRIPTION OF THE DRAWINGS

FIG. 5 is a side view of a perpendicularity verification device in accordance with a second embodiment;

FIG. 6 is a perspective view of the perpendicularity verification device of FIG. 5;

FIG. 7 is a perspective view illustrating use of the perpendicularity verification device of FIG. 5 for verifying perpendicularity of a concrete test specimen in a testing machine;

DETAILED DESCRIPTION

Figure 1:
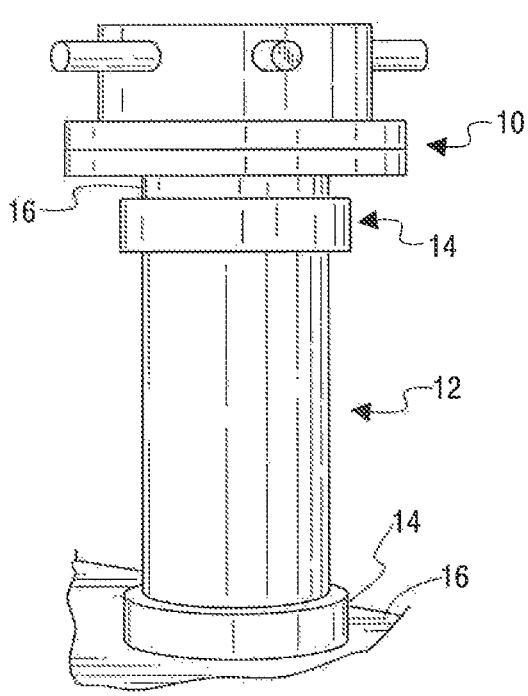
FIG. 1 is a perspective view of a testing machine for compression testing of cylindrical concrete specimens, including a concrete test specimen positioned therein.

FIG. 1 illustrates a conventional testing machine 10 for compression testing of a cylindrical concrete test specimen 12.

The concrete test specimen 12 can be formed using any known technique. Conventionally, the concrete test specimen 12 is approximately six inches in diameter. The height of the concrete test specimen 12 is approximately twelve inches. Alternatively, the concrete test specimen 12 may be four inches in diameter and eight inches long. As is apparent, depending on the procedure used for forming the concrete cylinder 12, the exact dimensions may vary.

The illustrated testing machine 10 comprises first and second retaining cups 14. Each of the retaining cups 14 is identical in construction. Each retaining cup 14 may be machined from high alloy steel to the same tolerance as platens 16 of the testing machine 10. The high alloy steel has minimal temperature variation and no deflection under loads. The high strength alloy steel retaining cups 14 resist scratching, thus eliminating the need for additional machining. In the illustrated embodiment of the invention, each retaining cup 14 is adapted for use with a six inch concrete test specimen 12 and has an outer diameter of about 7.25 inches and a height of about 1.5 inches.

As will be apparent, the retaining cups 14 satisfy the requirements of the bearing blocks defined in the ASTM Standard. As will be appreciated, the testing machine 10 is illustrated as an example and does not itself form part of the invention.

Figure 2:
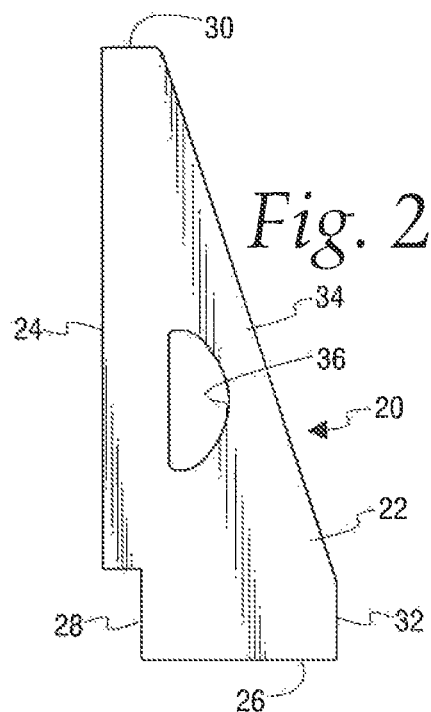
FIG. 2 is a side view of a perpendicularity verification device as described herein.
Figure 3:
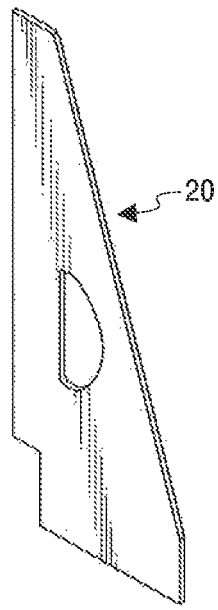
FIG. 3 is a perspective view of the perpendicularity device of FIG. 2.
Figure 4:
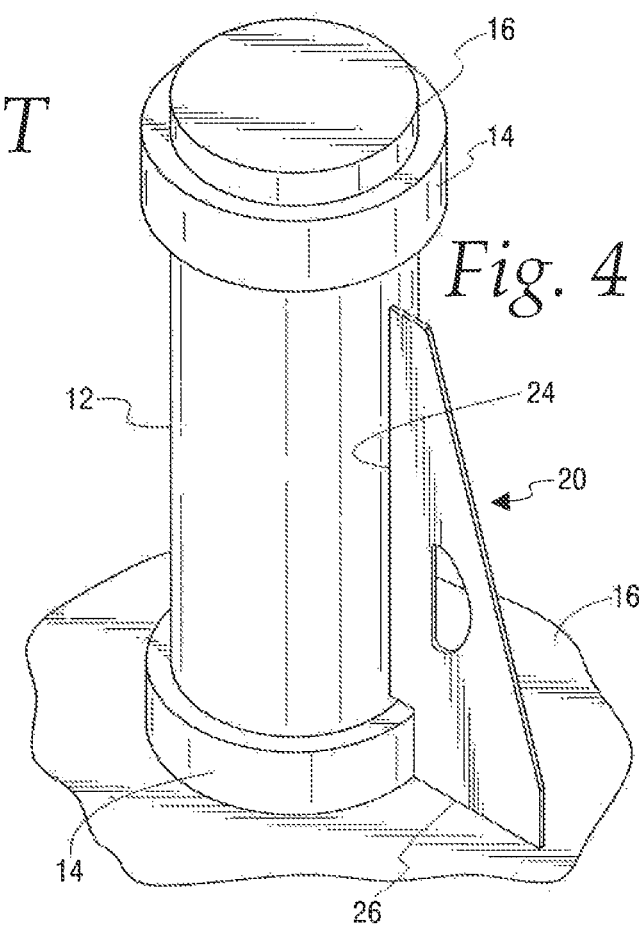
FIG. 4 is a perspective view illustrating use of the perpendicularity device of FIG. 2 to verify the perpendicularity of the concrete specimen in the testing machine.

Referring to FIGS. 2 and 3, a perpendicularity verification device 20 is illustrated. The device 20 is designed to rest on the lower platen 16 of the testing machine 10 and provide fast, easy and accurate verification of cylinder perpendicularity to demonstrate compliance with ASTM C39. The device 20 is configured to reach the test specimen 12 while avoiding contact with the top and bottom retaining cups 14.

The device 20 comprises a unitary planar sheet 22 of metal, such as aluminum. The sheet 22 has an elongate vertical straight side edge 24 and a horizontal straight bottom edge 26. The side edge 24 and bottom edge 26 are perpendicular to one another. A corner notch 28 is between the side edge 24 and the bottom edge 26. A top edge 30 and second side edge 32 adjoin a diagonal side edge 34, which is opposite the corner notch 28. The sheet 22 includes a through opening 36 defining a handle.

The device 20 is formed of a sheet 22 of about eleven to twelve inches long and four to five inches wide. In the illustrated embodiment, the sheet is 11¾ inches long and 4.5 inches wide. The vertical side edge 24 is about ten inches long. The bottom edge 26 may be about 3.5 to about 3.7 inches wide and in the illustrated embodiment is 3.65 inches wide. The corner notch 28 is thus about 0.58 inches wide and 1.75 inches tall. As will be appreciated, the corner notch 28 is sized according to the size of the retaining cup 14 so that the side edge 24 can reach the test cylinder 12 without the corner notch 28 contacting the retaining cup 14. The sheet is approximately 0.09 inches thick.

In use, the test specimen 12, with retaining cups 14, and any necessary pads (not shown) in place, is centered in the testing machine 10 between the platens 16, The specimen 12 is loaded to not more than 10% of the anticipated failure load and then loading is paused. The device 20 is placed with the bottom edge 26 on the lower platen 16 and slid so that the vertical side edge 24 is resting against the test specimen 12. Sufficient downward pressure should be placed on the device 20 to ensure that it remains flat against the lower platen 16.

Figure 8:
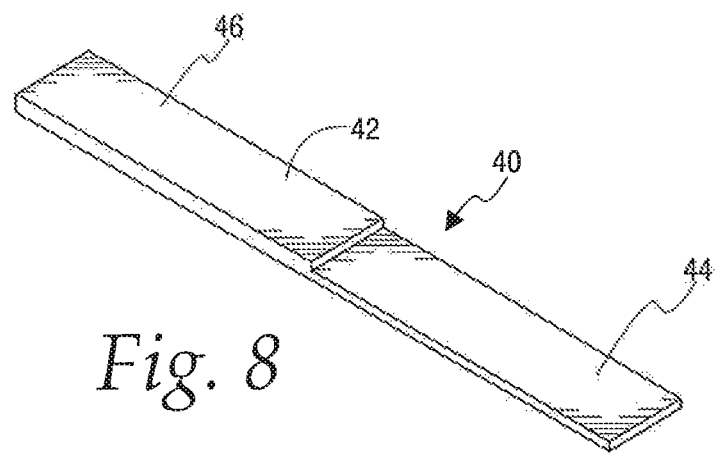
FIG. 8 is a perspective view of a gap measurement tool.

Referring to FIG. 8, a gap measurement tool 40 is illustrated to aid in the verification. The tool 40 comprises an elongate strip 42 having a thickness of 0.052 inches at a first end 44 and a thickness of 0.092 inches at a second end 46. The strip 42 is about three inches long.

For a six inch diameter concrete specimen, no gap larger than 0.92 inches between the device 20 and the concrete test specimen 12 is permitted.

Figure 9:
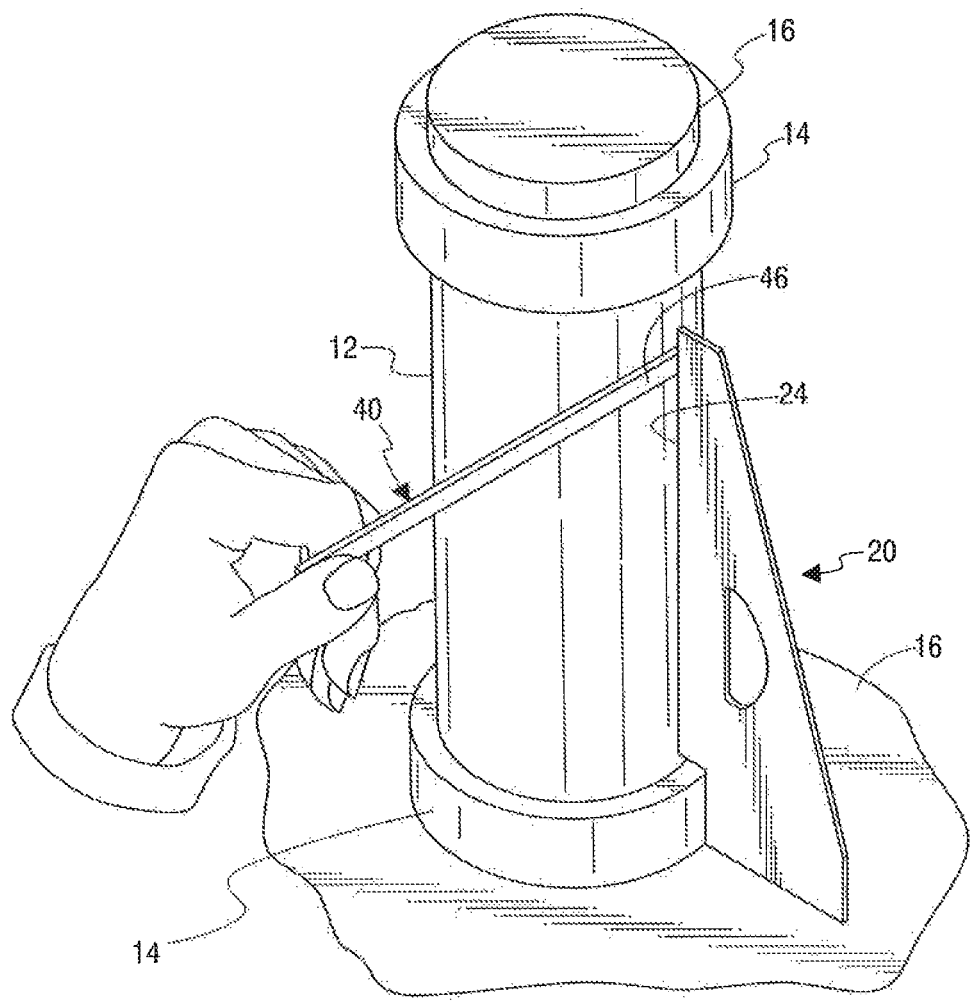
FIG. 9 is a perspective view, similar to FIG. 4, illustrating use of the gap measurement tool of FIG. 8.

Referring to FIG. 9, the tool 40 is used along the vertical edge 24 of the device 20 to verify that there are no gaps large enough to allow the tool second end 46 to pass through. If the tool 40 will not pass the device 20 at any point, then the compression test may proceed.

If the tool 40 is able to pass the device 20 at any point, then the load on the specimen 12 must be released, the specimen recentered in the cups 14 and then rechecked for perpendicularity. The compression test should not proceed until this test is satisfied.

Referring to FIGS. 5 and 6, a second perpendicularity verification device 120 is illustrated. The device 120 is configured for use with concrete test specimens four inches diameter and eight inches long.

As will be apparent, the numbering of the device 120 corresponds to that of the device 20, see FIG. 2, albeit in the 100 series.

The device 120 may be of similar overall size to the device 20. The vertical side edge 124 is about six inches long. The bottom edge 126 is about 2 to 2.5 inches wide and in the illustrated embodiment is 2.4 inches wide. Thus, the corner notch 128 has a height of about 5.5 inches and is about 2.1 inches wide. The device 120 is used as shown in FIG. 7 wherein a spacer 140 is provided between the lower platen 16 and retaining cup 14 due to the shorter height of the concrete test specimen 112. Owing to the additional height, and diameter of the spacer 140, a larger corner notch 128 is required. Otherwise, the use of the device 120 corresponds to the use of the device 20 discussed above. With the device 120, the first end 44 of the gap measurement tool 40 is used as no gap larger than 0.05 inches is permitted between the device 120 and the concrete test specimen 112.

The gaps described herein with respect to the tool 40 correspond to a 0.5 degrees of slope along the vertical length of the device 20 or 120 resting against the respective specimen 12 or 112.

The precise "L" shape of the devices 20 and 120 presents a properly sized and aligned vertical edge 24/124 to place against the concrete test specimen. Placing the short leg 26/126 on the flat, level and plane surface of the compression machine platen 16 allows a tester to position the device so that the long leg 24/124 is against the test specimen.

As will be appreciated, the specific size and materials are by way of example only as different sizes may be necessary owing to particular dimensions of a testing machine and/or bearing blocks and/or retaining cups.

Thus, as described herein, a system and method relate to verifying perpendicularity of concrete test specimens.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The invention claimed is:

1. A method of verifying perpendicularity of a concrete test specimen in a testing machine, comprising:
    positioning a concrete specimen with retaining cups on a platen of a testing machine;
    positioning a perpendicularity verification device on the platen, the device comprising a unitary planar sheet, the sheet having an elongate vertical straight side edge, a horizontal straight bottom edge, the side and bottom edges being perpendicular to one another, and a corner notch between the side and bottom edges;

with the bottom edge of the device resting on the platen with the notch circumventing the retaining cup positioning the vertical edge so that it rests against the test specimen; and verifying that any gaps between the vertical edge and the test specimen are less than a select amount to verify perpendicularity.

2. The method of claim 1 wherein the planar sheet is of metal.

3. The method of claim 1 wherein the planar sheet is of aluminum.

4. The method of claim 1 wherein the sheet is about 11 to 12 inches long and the vertical edge is about 10 inches long.

5. The method of claim 4 wherein the sheet is about 4 to 5 inches wide and the bottom edge is about 3.5 to about 3.7 inches wide.

6. The method of claim 1 wherein the sheet is about 11 to 12 inches long and the vertical edge is about 6 inches long.

7. The method of claim 1 wherein the sheet is about 4 to 5 inches wide and the bottom edge is about 2 to about 2.5 inches wide.

8. The method of claim 1 wherein the gap verification step comprises using a tool have a select thickness the sheet has a diagonal edge opposite the corner notch.

9. The method of claim 8 wherein the select thickness corresponds to 0.5 degrees of slope along vertical length of the test specimen.

10. The method of claim 1 wherein the sheet includes a through opening to provide a handle.

\* \* \* \* \*